(12) United States Patent
Oh (10) Patent No.: US 7,006,377 B2
(45) Date of Patent: Feb. 28, 2006

(54) APPARATUS AND METHOD FOR BOOTING NAND FLASH MEMORY OF A MOBILE TERMINAL

(75) Inventor: Hyuk Oh, Seoul (KR)

(73) Assignee: Samsung Electronics co., Ltd., (KR)

( * ) Notice: Subject to any disclaimer, the term of this patent is extended or adjusted under 35 U.S.C. 154(b) by 0 days.

(21) Appl. No.: 10/937,631

(22) Filed: Sep. 9, 2004

(65) Prior Publication Data

US 2005/0160219 A1  Jul. 21, 2005

(30) Foreign Application Priority Data

Jan. 20, 2004 (KR) .................. 10-2004-0004244

(51) Int. Cl.
*G11C 16/04* (2006.01)
(52) U.S. Cl. .................. 365/185.04; 365/185.17; 365/185.33
(58) Field of Classification Search .......... 365/185.04, 365/185.08, 185.11, 185.17, 185.33
See application file for complete search history.

(56) References Cited

U.S. PATENT DOCUMENTS

| | | | | |
|---|---|---|---|---|
| 6,026,016 A * | 2/2000 | Gafken | .................. | 365/185.04 |
| 6,240,040 B1 * | 5/2001 | Akaogi et al. | ......... | 365/185.33 |
| 6,275,412 B1 * | 8/2001 | Kasa et al. | ............ | 365/185.33 |
| 6,359,808 B1 * | 3/2002 | Chen et al. | ............ | 365/185.33 |
| 6,377,486 B1 * | 4/2002 | Lee | ....................... | 365/185.11 |
| 6,731,536 B1 * | 5/2004 | McClain et al. | ....... | 365/185.04 |
| 6,757,832 B1 * | 6/2004 | Silverbrook et al. | ... | 365/185.04 |

* cited by examiner

*Primary Examiner*—Trong Phan
(74) *Attorney, Agent, or Firm*—Dilworth & Barrese LLP (57) ABSTRACT

An apparatus and method for booting a NAND flash memory of a mobile terminal. The apparatus comprises a NAND flash memory, a synchronous dynamic random access memory (SDRAM), a main read only memory (ROM), a main control unit, and a sub-control unit. The NAND flash memory stores an application code necessary for execution of an additional function provided in the mobile terminal, and a secondary program loader (SPL) boot code for access to the application code. The SDRAM stores the SPL boot code and application code sent from the NAND flash memory. The main ROM stores code values for the booting of the NAND flash memory and an initial program loader (IPL) boot code for initial access to the NAND flash memory. The main control unit detects and outputs the IPL boot code from the main ROM in response to a reset signal inputted thereto and then outputs the reset signal. The sub-control unit receives the IPL boot code and reset signal output from the main control unit, drives the received IPL boot code in response to the received reset signal to access the NAND flash memory and receive the SPL boot code therefrom, stores the received SPL boot code in the SDRAM, drives the SPL boot code stored in the SDRAM to access the NAND flash memory and receive the application code therefrom, stores the received application code in the SDRAM, and completes the booting of the NAND flash memory by driving the application code stored in the SDRAM.

5 Claims, 6 Drawing Sheets

APPARATUS AND METHOD FOR BOOTING NAND FLASH MEMORY OF A MOBILE TERMINAL

PRIORITY

This application claims priority to an application entitled "APPARATUS AND METHOD FOR BOOTING NAND FLASH MEMORY OF MOBILE TERMINAL", filed in the Korean Intellectual Property Office on Jan. 20, 2004 and assigned Serial No. 2004-4244, the contents of which are incorporated herein by reference.

BACKGROUND OF THE INVENTION

1. Field of the Invention

The present invention relates to a mobile terminal, and more particularly to an apparatus and method for booting a NAND flash memory installed in a mobile terminal.

2. Description of the Related Art

In general, a mobile terminal refers to a wireless portable device that can provide a wireless communication service to a user through a radio communication with a base transceiver station. Mobile terminals are widespread and viewed as a necessity of life by those of all ages, sexes, or locations worldwide. The mobile terminal essentially includes a handset, data input/output unit, antenna unit, etc., in order to transmit and receive voice or image data signals to/from a counterpart.

Recently, mobile terminals with cameras have become widespread. These mobile terminals can capture images of desired objects and can store the captured images or transmit them using wireless or wire communication. To this end, the mobile terminals are supported with a technology that can display images of various pixel sizes on a screen.

Further, mobile terminals capable of supporting various multimedia functions, such as music playback, movie viewing, broadcast signal (television/radio signal) reception, and game execution, are being introduced to the market. Such mobile terminals need a memory that can store a program capable of processing various multimedia data. A flash memory is generally utilized to process this multimedia data.

Flash memories are generally classified into NOR and NAND types. A flash memory of the NOR type (referred to hereinafter as a 'NOR flash memory') is simple to use because it utilizes the same interface as that of a random access memory (RAM), but has the disadvantages of being high in price and low in data processing speed. A flash memory of the NAND type (referred to hereinafter as a 'NAND flash memory') is advantageous in that it is lower in price and higher in data processing speed than the NOR flash memory and can be mass-integrated.

Recently, NAND flash memories have often been used as read only memories (ROMs) of mobile terminals. However, such a NAND flash memory is disadvantageous in that it is hard to read or write data from/into the memory and it is impossible to independently boot the memory like the NOR flash memory. There have been proposed various ways to boot a NAND flash memory incapable of being independently booted.

A description will hereinafter be given of conventional methods for booting a NAND flash memory installed in a mobile terminal.

Conventional NAND flash memory booting methods consist of using a boot logic, using a boot ROM, and using a NAND interface chip.

Figure 1:
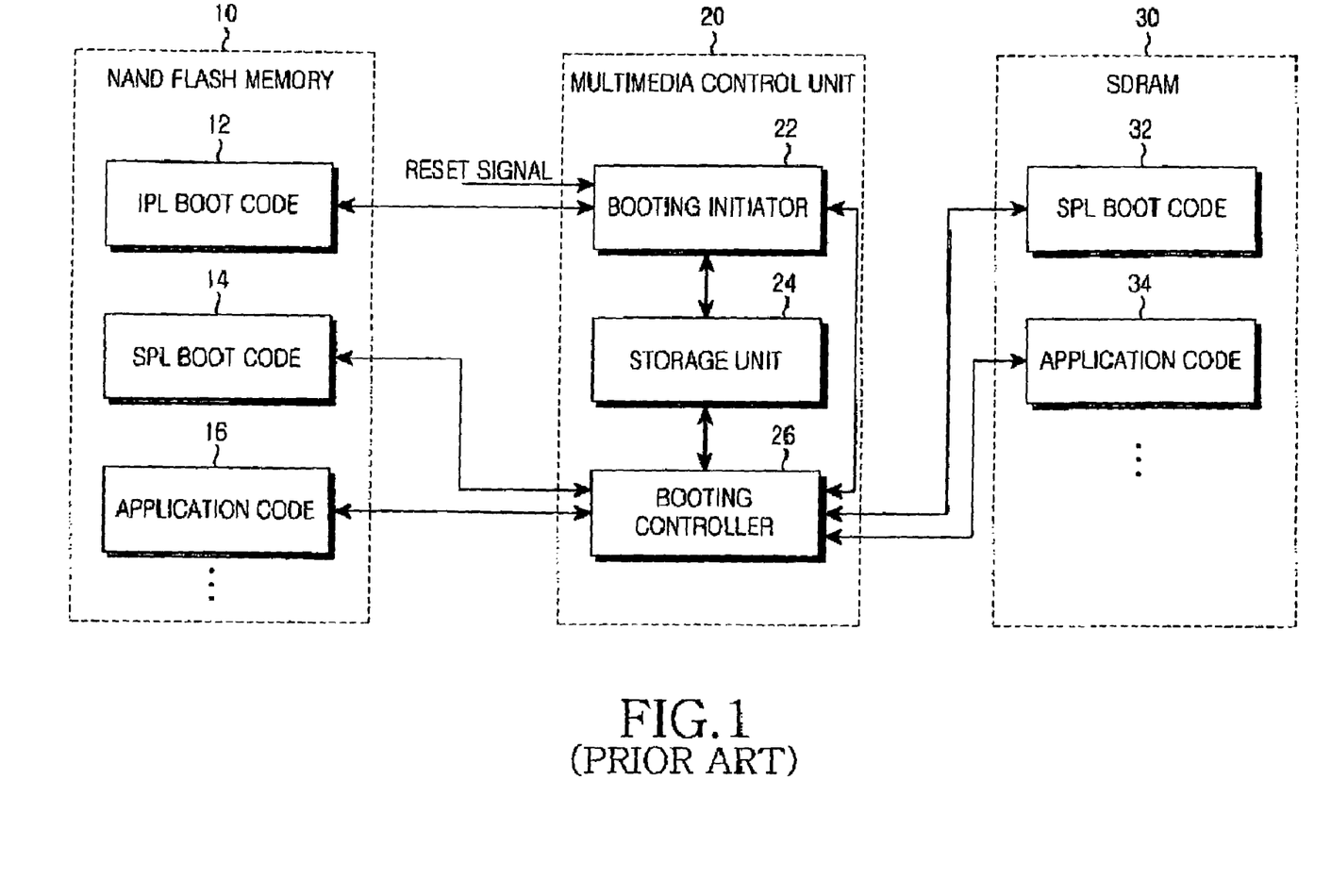
FIG. 1 is a block diagram illustrating the configuration of a conventional apparatus for booting a NAND flash memory of a mobile terminal using a boot logic.

FIG. 1 is a block diagram illustrating the configuration of a conventional apparatus for booting a NAND flash memory of a mobile terminal using a boot logic.

The NAND flash memory, denoted by the reference numeral 10, is adapted to store an initial program loader (IPL) boot code 12, a secondary program loader (SPL) boot code 14 and an application code 16.

The IPL boot code 12 allows a multimedia control unit 20 to access the NAND flash memory 10 to boot it. The IPL boot code 12 has a capacity of 2 to 4 KB. It is also used to copy the SPL boot code 14, which is an actual code for booting, to a synchronous dynamic random access memory (SDRAM) 30. The IPL boot code 12 is also used to set the operation of the multimedia control unit 20 and initialize the SDRAM 30.

The SPL boot code 14 is a code to actually boot the NAND flash memory 10. The SPL boot code 14 is used to copy the application code 16 to the SDRAM 30. The SPL boot code 14 is also used to download data from an external device, such as a computer, for software upgrade.

The application code 16 is a code that is used for the booting of the NAND flash memory 10. The application code 16 generally refers to an operating system (OS) program of the mobile terminal.

The multimedia control unit 20 is adapted to control the multimedia functions of the mobile terminal. This multimedia control unit 20 includes a booting initiator 22, a storage unit 24 and a booting controller 26.

The booting initiator 22, which is the boot logic, requests the IPL boot code 12 of the NAND flash memory 10 upon receiving a reset signal as power is supplied to the mobile terminal. The booting initiator 22 stores the IPL boot code 12 sent from the NAND flash memory 10 in the storage unit 24 and sends, to the booting controller 26 result information indicating that the IPL boot code 12 has been copied from the NAND flash memory 10.

The booting controller 26 drives the IPL boot code 12, stored in the storage unit 24, to access the NAND flash memory 10 and request the SPL boot code 14 thereof. The booting controller 26 stores in the SDRAM 30 the SPL boot code 14 sent from the NAND flash memory 10 as an SPL boot code 32. The booting controller 26 drives the SPL boot code 32 stored in the SDRAM 30 to access the NAND flash memory 10 and request the application code 16 thereof. The booting controller 26 stores in the SDRAM 30 the application code 16 sent from the NAND flash memory 10 as an application code 34.

The booting controller 26 completes the booting operation by driving the application code 34 stored in the SDRAM 30.

Figure 2:
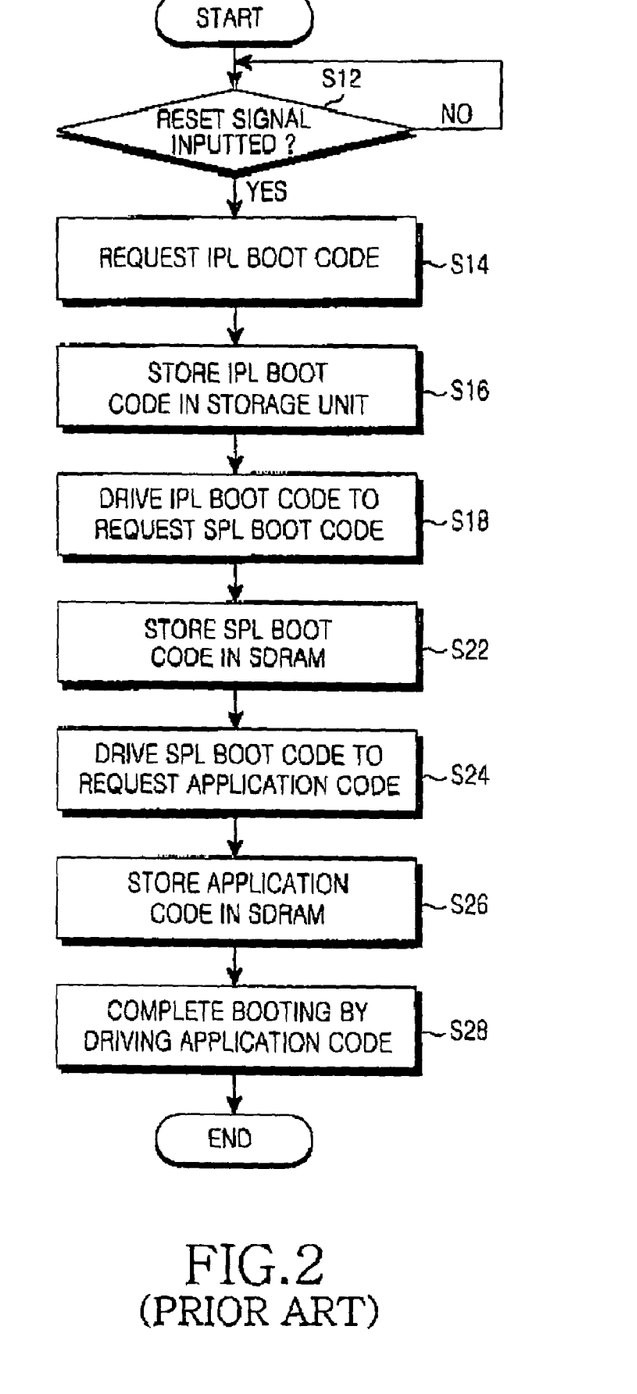
FIG. 2 is a flow chart illustrating a conventional method for booting the NAND flash memory using the booting apparatus of FIG. 1.

FIG. 2 is a flow chart illustrating a conventional method for booting the NAND flash memory using the booting apparatus of FIG. 1.

First, the booting initiator 22 determines whether or not the reset signal is input as power is supplied to the mobile terminal (S12). Upon determining that the reset signal is input, the booting initiator 22 requests the NAND flash memory 10 to send the IPL boot code 12 (S14). If the NAND flash memory 10 sends the IPL boot code 12 in response to the sending request, then the booting initiator 22 receives the IPL boot code 12 and stores it in the storage unit 24 (S16). At this time, the booting initiator 22 sends, to the booting controller 26, result information indicating that the IPL boot code 12 has been copied from the NAND flash memory 10.

The booting controller 26 drives the IPL boot code 12 stored in the storage unit 24 to access the NAND flash memory 10 and requests the NAND flash memory 10 to send the SPL boot code 14 (S18). Upon receiving the SPL boot code 14 sent from the NAND flash memory 10, the booting controller 26 stores the received SPL boot code 14 in the SDRAM 30 (S22).

The booting controller 26 then drives the SPL boot code 32 stored in the SDRAM 30 to access the NAND flash memory 10 and requests the NAND flash memory 10 to send the application code 16 (S24). Upon receiving the application code 16 sent from the NAND flash memory 10, the booting controller 26 stores the received application code 16 in the SDRAM 30 (S26). The booting controller 26 then completes the booting operation by driving the application code 34 stored in the SDRAM 30 (S28).

A conventional method for booting a NAND flash memory using a boot ROM can be implemented by replacing the booting initiator 22 that is the boot logic in FIG. 1 with the boot ROM. Thus, the NAND flash memory booting method performs the same operation as in FIGS. 1 and 2 by using a conventional booting apparatus with the boot ROM replacing the booting initiator 22.

The conventional NAND flash memory booting apparatus is disadvantageous in that the boot logic or boot ROM must be provided in the multimedia control unit 20 for the booting of the NAND flash memory, thereby making it difficult to integrate the multimedia control unit 20, thus increasing the size and costs thereof.

In addition, the SDRAM 30 is initialized in different manners based on different types thereof. Since the boot logic or boot ROM is pre-installed in the multimedia control unit 20 to perform only a predetermined operation, it is impossible to change settings of the boot logic or codes stored in the boot ROM. For this reason, in order to perform the booting operation using the conventional NAND flash memory booting apparatus, it is necessary to use a dedicated SDRAM, or additionally use a RAM that is compatible with the SDRAM.

Figure 3:
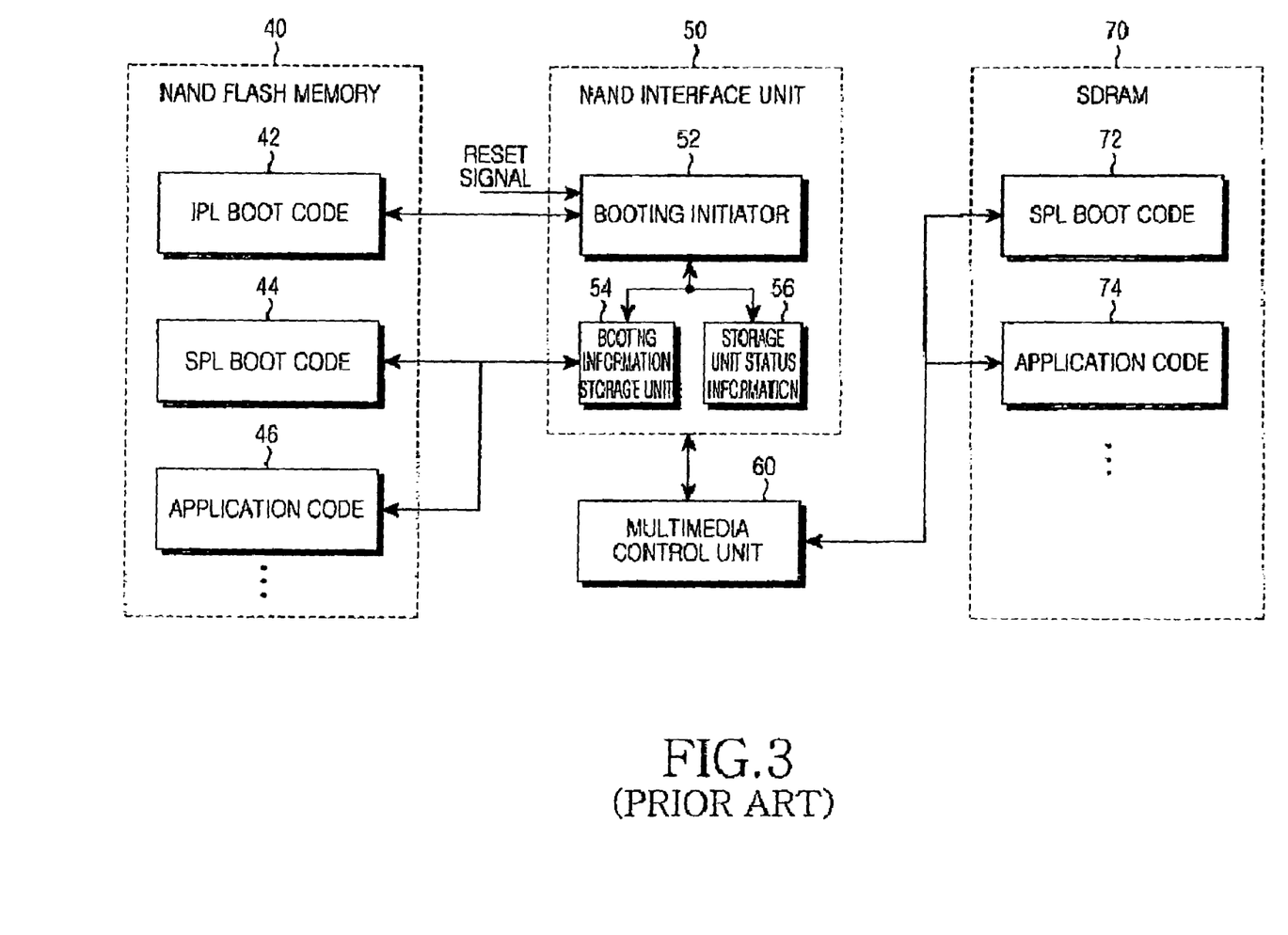
FIG. 3 is a block diagram illustrating the configuration of a conventional apparatus for booting a NAND flash memory of a mobile terminal using a NAND interface chip.

FIG. 3 is a block diagram illustrating the configuration of a conventional apparatus for booting a NAND flash memory of a mobile terminal using a NAND interface chip.

The NAND flash memory 40 and an SDRAM 70 are adapted to store the same codes as those stored in the NAND flash memory 10 and SDRAM 30 in FIG. 1, respectively.

A NAND interface unit 50 provides an interface for enabling a multimedia control unit 60 to access the NAND flash memory 40.

The NAND interface unit 50 includes a booting initiator 52, a booting information storage unit 54 and a status information storage unit 56. The booting initiator 52 performs an initial operation for the booting of the NAND flash memory 40 in response to a reset signal inputted thereto. The booting information storage unit 54 stores an IPL boot code 42 which is necessary for the initial booting operation. The status information storage unit 56 stores operation commands associated with the NAND flash memory 40, the address information of the NAND flash memory 40 and the status information thereof.

The multimedia control unit 60 drives the IPL boot code 42, stored in the booting information storage unit 54, to read an SPL boot code 44, which is an actual code for booting, stored in the NAND flash memory 40, and store the read SPL boot code 44 as an SPL boot code 72 in the SDRAM 70. The multimedia control unit 60 drives the SPL boot code 72, stored in the SDRAM 70, to read an application code 46 stored in the NAND flash memory 40 and store in the SDRAM 70 the read application code 46 as an application code 74. The multimedia control unit 60 completes the booting of the NAND flash memory 40 by driving the application code 74 stored in the SDRAM 70.

Figure 4:
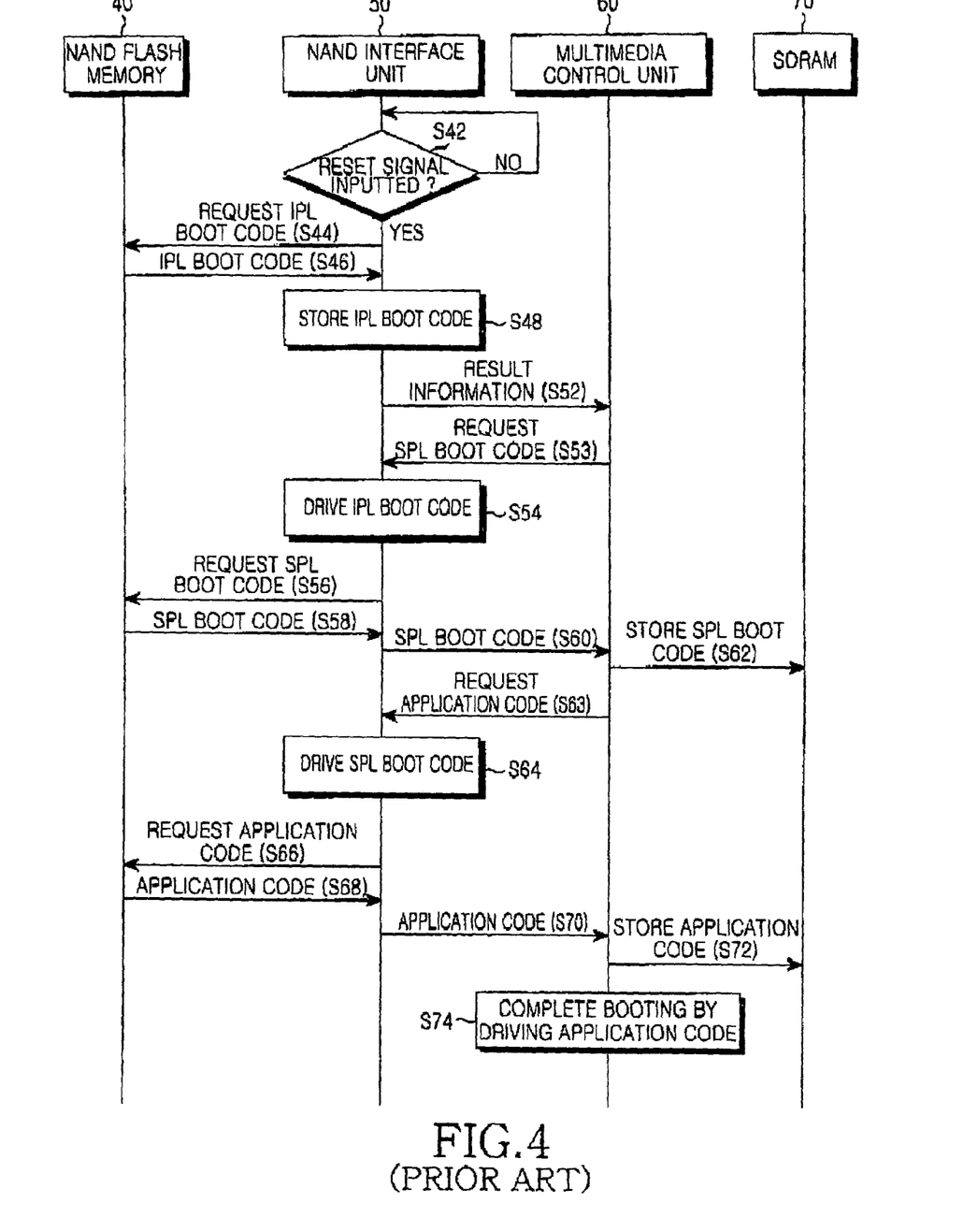
FIG. 4 is a flow chart illustrating a conventional method for booting the NAND flash memory using the booting apparatus of FIG. 3.

FIG. 4 is a flow chart illustrating a conventional method for booting the NAND flash memory using the booting apparatus of FIG. 3.

First, the booting initiator 52 of the NAND interface unit 50 determines if the reset signal is input (S42). Upon determining that the reset signal is input, the booting initiator 52 accesses the NAND flash memory 40 to request it to send the IPL boot code 42 (S44). If the booting initiator 52 receives the requested IPL boot code 42 from the NAND flash memory 40 (S46), then the booting initiator 52 stores the received IPL boot code 42 in the booting information storage unit 54 (S48). At this time, the booting initiator 52 sends, to the multimedia control unit 60, result information indicating that the copying of the IPL boot code 42 stored in the NAND flash memory 40 has been completed (S52).

Upon receiving the IPL boot code copy completion information from the booting initiator 52, the multimedia control unit 60 sends an SPL boot code request signal to the NAND interface unit 50 (S53). The NAND interface unit 50 drives the IPL boot code 42 stored in the booting information storage unit 54 in response to the SPL boot code request signal sent from the multimedia control unit 60 (S54). The NAND interface unit 50 accesses the NAND flash memory 40 using the IPL boot code to request the NAND flash memory 40 to send the SPL boot code 44 (S56). If the NAND interface unit 50 receives the requested SPL boot code from the NAND flash memory 40 (S58), then the NAND interface unit 50 sends the received SPL boot code to the multimedia control unit 60 (S60). The multimedia control unit 60 receives the SPL boot code sent from the NAND interface unit 50 and stores the SPL boot code in the SDRAM 70 (S62).

If the storage of the SPL boot code in the SDRAM 70 is completed, the multimedia control unit 60 sends an application code request signal to the NAND interface unit 50 (S63). Upon receiving the application code request signal from the multimedia control unit 60, the NAND interface unit 50 drives the SPL boot code stored in the SDRAM 70 (S64). The NAND interface unit 50 accesses the NAND flash memory 40 using the driven SPL boot code to request to send the application code (S66).

If the NAND interface unit 50 receives the requested application code from the NAND flash memory 40 (S68), then the NAND interface unit 50 sends the received application code to the multimedia control unit 60 (S70). The multimedia control unit 60 receives the application code sent from the NAND interface unit 50 and stores the application code in the SDRAM 70 (S72).

The multimedia control unit 60 completes the booting of the NAND flash memory 40 by driving the application code stored in the SDRAM 70 (S74).

When designing the booting apparatus with the structure as shown in FIG. 3, it is necessary to include a new module, such as the NAND interface unit 50, in the booting apparatus, resulting in difficulty with the integration in the mobile terminal. Moreover, it is not possible to modify settings of the booting initiator 52 boot logic provided in the NAND interface unit 50. For this reason, in order to smoothly boot the NAND flash memory 40, it is necessary to use a dedicated SDRAM or additionally use a new RAM.

The additional use of a new RAM results in a great inconvenience of having to divide one boot code by two or three because of a limitation in the size of the RAM. The reason is that only a RAM with a capacity of 2 to 4 KB is available since the larger capacity increases the chip size.

Furthermore, in the case of booting the NAND flash memory 40 using the NAND interface unit 50, the multimedia control unit 60 cannot access the NAND flash memory 40 at the optimum timing because it does not directly accesses the NAND flash memory 40, but must access it via the NAND interface unit 50.

SUMMARY OF THE INVENTION

Therefore, the present invention has been made in view of the above problems, and it is an object of the present invention to provide an apparatus and method for booting a NAND flash memory.

It is another object of the present invention to provide an apparatus and method for booting a NAND flash memory, wherein the NAND flash memory can be accessed and booted at the optimum timing through a simple structure.

In accordance with an aspect of the present invention, the above and other objects can be accomplished by the provision of an apparatus for booting a NAND flash memory of a mobile terminal, comprising: NAND flash memory adapted for storing an application code and a secondary program loader (SPL) boot code for access to the application code; a synchronous dynamic random access memory (SDRAM) for storing the SPL boot code and application code upon its transmission from the NAND flash memory; a main storage means for storing code values for the booting of the NAND flash memory and sharing an initial program loader (IPL) boot code for initial access to the NAND flash memory; a main control means for detecting and outputting the IPL boot code from the main storage means in response to a reset signal inputted thereto, and outputting the reset signal; and sub-control means for receiving the IPL boot code and a reset signal output from the main control means, driving the received IPL boot code in response to the received reset signal to access the NAND flash memory and receive the SPL boot code therefrom, storing the received SPL boot code in the SDRAM, driving the SPL boot code stored in the SDRAM to access the NAND flash memory and receive the application code therefrom, storing the received application code in the SDRAM, and completing the booting of the NAND flash memory by driving the application code stored in the SDRAM.

Preferably, the sub-control means includes: an interface for interfacing with the main control means; a booting information storage unit for storing the IPL boot code output from the main control means; and a booting controller for performing signal transmission and reception with the main control means via the interface, accessing the NAND flash memory using the IPL boot code and SPL boot code, storing the SPL boot code and application code in the SDRAM and driving the stored SPL boot code and application code.

In accordance with another aspect of the present invention, there is provided a method for booting a NAND flash memory of a mobile terminal, comprising the steps of: a) detecting by a main control unit, an IPL boot code for access to the NAND flash memory from a main ROM in response to a reset signal inputted thereto and sending by the main control unit the detected IPL boot code to a sub-control unit; b) sending by the main control unit the inputted reset signal to the sub-control unit if the sending of the IPL boot code is completed; c) driving by the sub-control unit the IPL boot code in response to the reset signal sent from the main control unit to access the NAND flash memory and requests the NAND flash memory to send an SPL boot code; d) receiving by the sub-control unit the SPL boot code from the NAND flash memory and storing by the sub-control unit in an SDRAM; e) driving by the sub-control unit the SPL boot code stored in the SDRAM to access the NAND flash memory and requests the NAND flash memory to send an application code; f) receiving by the sub-control unit the application code from the NAND flash memory and storing by the sub-control unit the application code in the SDRAM; and g) completing by the sub-control unit the booting of the NAND flash memory by driving the application code stored in the SDRAM.

Preferably, the method further comprises the step of h) receiving and storing by the sub-control unit the IPL boot code sent from the main control unit. The sub-control unit, upon receiving the reset signal after completion of the storage of the IPL boot code, drives the IPL boot code to access the NAND flash memory.

In a feature of the present invention, an IPL boot code for providing initial access to a NAND flash memory of a mobile terminal for booting thereof is stored in a main ROM which is operated under control of a main control unit, and not in the NAND flash memory. Upon receiving a reset signal, the main control unit provides the IPL boot code stored in the main ROM to a sub-control unit so that the sub-control unit can access and boot the NAND flash memory using the provided IPL boot code. There is no need for a boot logic or boot ROM for the initial access to the NAND flash memory for the booting thereof. Further, because the IPL boot code is stored in the main ROM for use in the booting of the NAND flash memory, the IPL boot code can be modified as needed, thereby enabling the booting of the NAND flash memory. Furthermore, the sub-control unit can access the NAND flash memory without using a separate interface, thereby making it possible to access the NAND flash memory at the optimum timing and integrate the mobile terminal.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the annexed drawings. In the drawings, the same or similar elements are denoted by the same reference numerals even though they are depicted in different drawings. In the following description of the present invention, a detailed description of known functions and configurations incorporated herein will be omitted when it may obscure the subject matter of the present invention.

Figure 5:
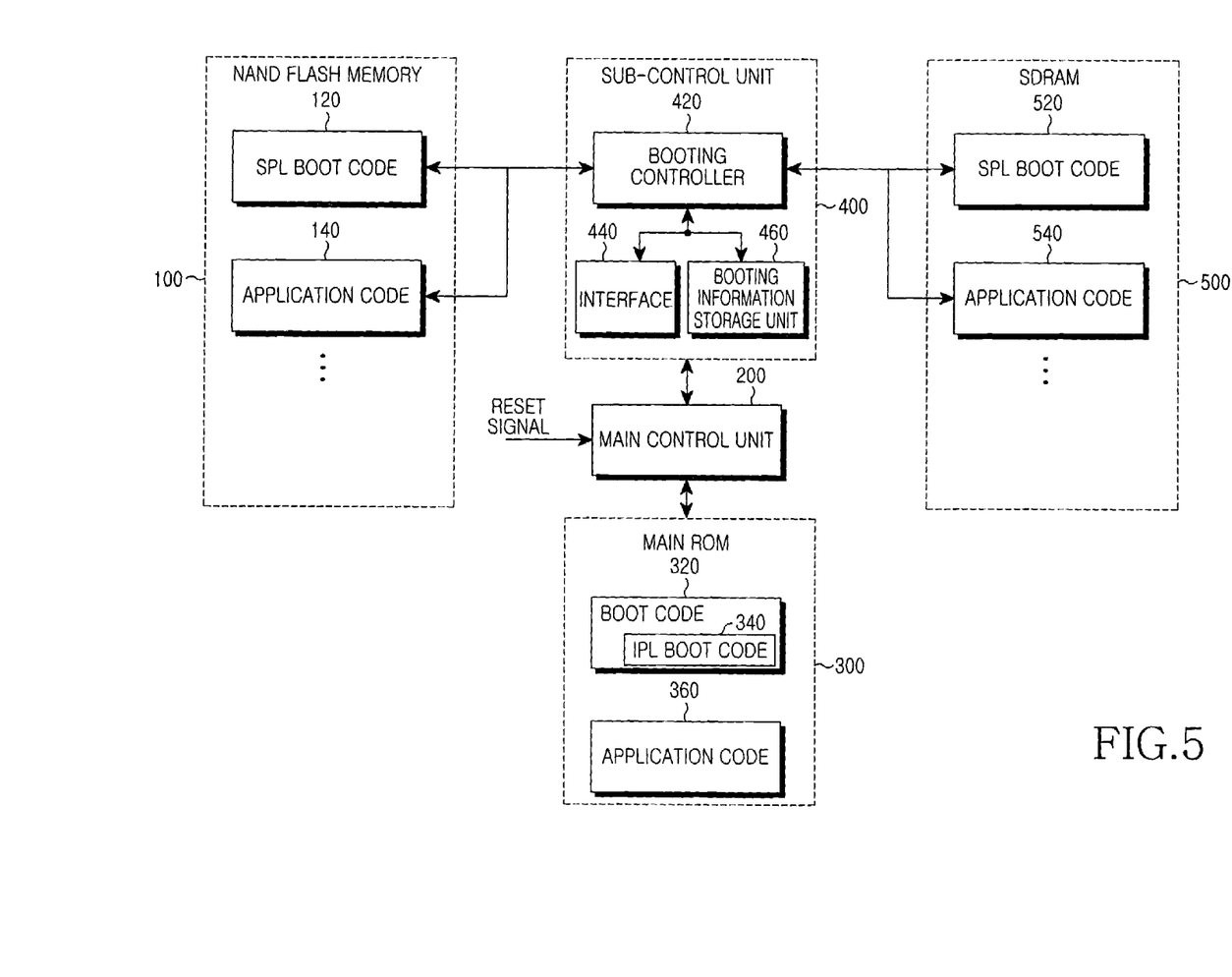
FIG. 5 is a block diagram showing a preferred embodiment of an apparatus for booting a NAND flash memory of a mobile terminal according to the present invention.

FIG. 5 is a block diagram illustrating a preferred embodiment of an apparatus for booting a NAND flash memory of a mobile terminal according to the present invention.

The NAND flash memory, denoted by the reference numeral 100, is adapted to store a secondary program loader (SPL) boot code 120 and an application code 140.

The SPL boot code 120 is a code to actually boot the NAND flash memory 100. The SPL boot code 120 is used to copy the application code 140 to an SDRAM 500. It may also be used to download data from an external device, such as a computer, for software upgrade.

The application code 140 is a code that is used for the actual booting of the NAND flash memory 100. The application code 140 generally contains an operating system (OS) program of the mobile terminal.

A main control unit 200 is adapted to control the entire operation of the mobile terminal. In the present embodiment, upon receiving a reset signal as power is supplied to the mobile terminal, the main control unit 200 detects an initial program loader (IPL) boot code 340 from a main ROM 300, which stores code values for booting, and sends the detected IPL boot code 340 to a sub-control unit 400.

The main ROM 300 stores an application code 360 and a boot code 320 for the booting of the NAND flash memory 100 under the control of the main control unit 200. In the present embodiment, the boot code 320 contains the IPL boot code 340, which is used to allow the sub-control unit 400 to access the NAND flash memory 100 to boot it.

The IPL boot code 340 contained in the boot code 320 in the main ROM 300 has a const array as follows.

"const unsigned char ipl_bootcode[]={0x18, 0xF0, 0x9F, 0xE5, 0x18, 0xF0, 0x9F, 0xE5, 0x18, 0xF0, 0x9F, 0xE5, 0x18, 0xF0, 0x9F, 0xE5, 0x18, 0xF0, 0x9F, 0xE5, 0x00, 0x00, 0xA0, 0xE1, 0x18, 0xF0, 0x9F, 0xE5, 0x18, 0xF0, 0x9F, 0xE5, 0x84, 0x03, 0xC0, 0xFF, 0x6C, 0x03, 0xC0, 0xFF, 0x70, 0x03, 0xC0, 0xFF, 0x74, 0x03, 0xC0, 0xFF, 0x78, 0x03, 0xC0, 0xFF, 0x00, 0x00, 0x00, 0x00, 0x7C, 0x03, 0xC0, 0xFF, 0x80, 0x03, 0xC0, 0xFF, . . . }"

The main control unit 200, upon receiving the reset signal, detects the IPL boot code 340 with the above const array contained in the boot code 320 in the main ROM 300 and sends the const array to the sub-control unit 400 via an interface 440. If the main control unit 200 completes the sending of the IPL boot code 340, then the main control unit 200 sends the reset signal to the sub-control unit 400.

The IPL boot code 340 sub-control unit 400 to access the NAND flash memory 100 to boot it. The IPL boot code 340 has a capacity of 2 to 4 KB. It is also used to copy to the SDRAM 500 the SPL boot code 120, which is an actual code for booting. The IPL boot code 340 is also used to set the operation of the sub-control unit 400 and initialize the SDRAM 500.

The sub-control unit 400 is adapted to control new functions included in the mobile terminal, such as multimedia functions, among various functions of the mobile terminal, and also controls the booting of the NAND flash memory 100 to set applications necessary for the new functions.

The sub-control unit 400 includes a booting controller 420, the interface 440, and a booting information storage unit 460. The booting controller 420 controls the booting of the NAND flash memory 100. The interface 440 provides an interface with the main control unit 200. The booting information storage unit 460 stores the information necessary for the booting of the NAND flash memory 100.

If the IPL boot code 340 from the main control unit 200 is input via the interface 440, the booting controller 420 stores the input IPL boot code 340 in the booting information storage unit 460. If the storage of the IPL boot code 340 is completed and the reset signal from the main control unit 200 is input, the booting controller 420 drives the IPL boot code stored in the booting information storage unit 460 to access the NAND flash memory 100 and requests the NAND flash memory 100 to send the SPL boot code 120.

Upon receiving the SPL boot code 120 from the NAND flash memory 100, the booting controller 420 stores in the SDRAM 500 the received SPL boot code 120 as an SPL boot code 520. The booting controller 420 drives the SPL boot code 520 stored in the SDRAM 500 to access the NAND flash memory 100 and requests the NAND flash memory 100 to send the application code 140.

If the booting controller 420 receives the application code 140 from the NAND flash memory 100, the booting controller 420 stores in the SDRAM 500 the received application code 140 as an application code 540 in the SDRAM 500. The booting controller 420 completes the booting of the NAND flash memory 100 by driving the application code 540 stored in the SDRAM 500.

As described above, the IPL boot code for the initial access to the NAND flash memory 100 for the booting thereof is stored in the main ROM 300 which is under the control of the main control unit 200, and not stored in the NAND flash memory 100. Upon receiving the reset signal, the main control unit 200 provides the IPL boot code stored in the main ROM 300 to the sub-control unit 400 so that the sub-control unit 400 can access and boot the NAND flash memory 100 using the provided IPL boot code. Therefore, there is no need for a boot logic or a boot ROM for the initial access to the NAND flash memory 100 for the booting thereof, thereby making it possible for integration into the mobile terminal.

In addition, because the IPL boot code is stored in the main ROM 300 for use in the booting of the NAND flash memory 100, it can be modified as needed, thereby enabling the booting of the NAND flash memory 100 to be performed more adaptively to new multimedia programs.

Furthermore, the sub-control unit 400 can access the NAND flash memory 100 without using a separate interface, thereby making it possible to access the NAND flash memory 100 at the optimum timing.

Figure 6:
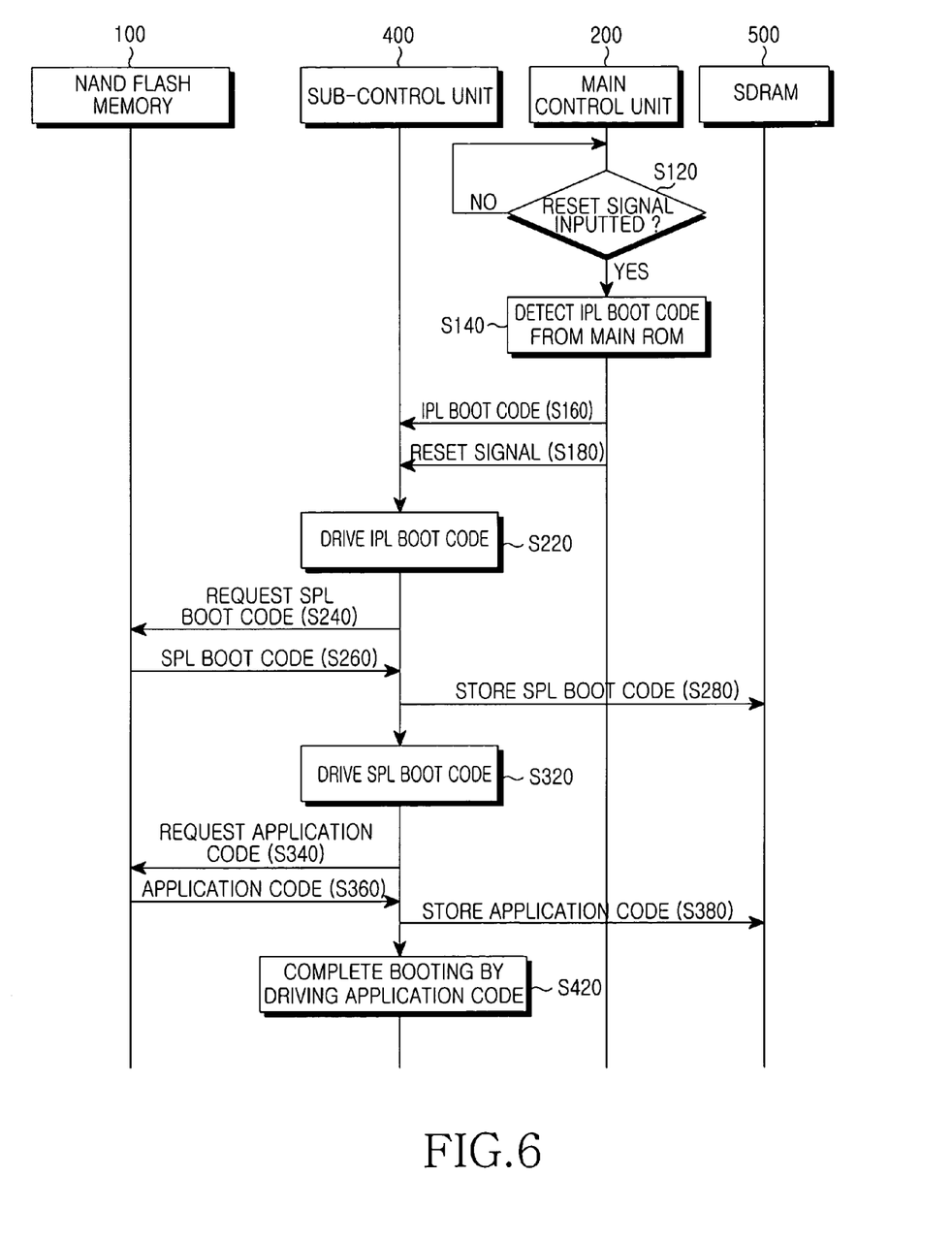
FIG. 6 is a flow chart illustrating a preferred embodiment of a booting method using the NAND flash memory booting apparatus according to the present invention.

FIG. 6 is a flow chart illustrating a preferred embodiment of a booting method using the NAND flash memory booting apparatus according to the present invention.

First, the main control unit 200 determines if the reset signal is input as power is supplied to the mobile terminal (S120).

Upon determining that the reset signal is input, the main control unit 200 detects the IPL boot code 340 from the boot code 320 in the main ROM 300 (S140). The main control unit 200 then sends the detected IPL boot code 340 to the sub-control unit 400 via the interface 440 (S160). If the main control unit 200 completes the sending of the IPL boot code 340 to the sub-control unit 400, the main control unit 200 sends the input reset signal to the sub-control unit 400 via the interface 440 (S180).

The booting controller 420 of the sub-control unit 400 receives the IPL boot code sent from the main control unit 200, stores the received IPL boot code in the booting information storage unit 460, and drives the stored IPL boot code upon receiving the reset signal from the main control unit 200 (S220). At this time, the booting controller 420 accesses the NAND flash memory 100 using the driven IPL boot code to request the NAND flash memory 100 to send the SPL boot code 120 (S240).

The NAND flash memory 100 sends the SPL boot code 120 stored therein to the sub-control unit 400 in response to the SPL boot code request (S260). The booting controller 420 of the sub-control unit 400 receives the SPL boot code 120 sent from the NAND flash memory 100 and stores the SPL boot code 120 in the SDRAM 500 (S280).

If the SPL boot code storage in the SDRAM 500 is completed, then the booting controller 420 drives the SPL boot code 520 stored in the SDRAM 500 (S320). At this time, the booting controller 420 accesses the NAND flash memory 100 using the driven SPL boot code to request the NAND flash memory 100 to send the application code 140 (S340).

The NAND flash memory 100 sends the application code 140 to the sub-control unit 400 in response to the application code request (S360). The booting controller 420 of the sub-control unit 400 receives the application code 140 sent from the NAND flash memory 100 and stores the application code 140 in the SDRAM 500 (S380). Upon completion of the application code storage, the booting controller 420 completes the booting of the NAND flash memory 100 by driving the application code 540 stored in the SDRAM 500 (S420).

In brief, the IPL boot code for the initial access to the NAND flash memory 100 for the booting thereof is stored in the main ROM 300 which is controlled by the main control unit 200, and not stored in the NAND flash memory 100. In response to the reset signal input thereto, the main control unit 200 provides the IPL boot code stored in the main ROM 300 to the sub-control unit 400, which then accesses and boots the NAND flash memory 100 using the provided IPL boot code. As a result, there is no need for a boot logic or a boot ROM for the initial access to the NAND flash memory 100 for the booting thereof.

Moreover, because the IPL boot code is stored in the main ROM for use in the booting of the NAND flash memory, it can be modified as needed, thereby enabling the booting of the NAND flash memory to be performed more adaptively to new multimedia programs.

Furthermore, the sub-control unit can access the NAND flash memory without using a separate interface, thereby making it possible to access the NAND flash memory at the optimum timing.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for booting a NAND flash memory comprising:
   a NAND flash memory for storing an application code and a boot code;
   a memory for storing said boot code and application code upon its transmission from said NAND flash memory;
   main storage means for storing code values for the booting of said NAND flash memory and an initial boot code for initial access to said NAND flash memory;
   main control means for detecting and outputting said initial boot code from said main storage means in response to a reset signal input thereto and outputting the reset signal; and
   sub-control means for completing the booting of said NAND flash memory by controlling said NAND flash memory and said memory on the basis of said initial boot code and said reset signal output from said main control means.

2. An apparatus for booting a NAND flash memory comprising:
   a NAND flash memory for storing an application code and a secondary program loader (SPL) boot code;
   a synchronous dynamic random access memory (SDRAM) for storing said SPL boot code and application code upon its transmission from said NAND flash memory;
   main storage means for storing code values for the booting of said NAND flash memory and an initial program loader (IPL) boot code for initial access to said NAND flash memory;
   main control means for detecting and outputting said IPL boot code from said main storage means in response to a reset signal input thereto and outputting the reset signal; and
   sub-control means for receiving said IPL boot code and reset signal output from said main control means, driving the received IPL boot code in response to the received reset signal to access said NAND flash memory and receive said SPL boot code from said NAND flash memory, storing the received SPL boot code in said SDRAM, driving said SPL boot code stored in said SDRAM to access said NAND flash memory and receive said application code from said NAND flash memory, storing the received application code in said SDRAM, and completing the booting of said NAND flash memory by driving said application code stored in said SDRAM.

3. The apparatus as set forth in claim 2, wherein said sub-control means includes:
   an interface for interfacing with said main control means;
   a booting information storage unit for storing said IPL boot code output from said main control means; and
   a booting controller for performing signal transmission and reception with said main control means via said interface, accessing said NAND flash memory using said IPL boot code and SPL boot code, storing said SPL boot code and application code in said SDRAM, and driving the stored SPL boot code and application code.

4. A method for booting a NAND flash memory using a NAND flash memory booting apparatus, said apparatus including a main control unit for controlling a general operation of said mobile terminal, a main read only memory (ROM) for storing code values necessary for a control operation of said main control unit, a sub-control unit for controlling a new multimedia function provided in said mobile terminal, said NAND flash memory for storing booting data for said multimedia function, and an SDRAM, said method comprising the steps of:
   a) detecting by said main control unit an IPL boot code for access to said NAND flash memory from said main ROM in response to a reset signal input thereto and sending by said main control unit the detected IPL boot code to said sub-control unit;
   b) sending by said main control unit the inputted reset signal to said sub-control unit if the sending of said IPL boot code is completed;

c) driving by said sub-control unit said IPL boot code in response to said reset signal sent from said main control unit to access said NAND flash memory and request said NAND flash memory to send an SPL boot code;
d) receiving by said sub-control unit said SPL boot code from said NAND flash memory and storing said IPL boot code in said SDRAM;
e) driving by said sub-control unit said SPL boot code stored in said SDRAM to access said NAND flash memory and request said NAND flash memory to send an application code;
f) receiving by said sub-control unit said application code from said NAND flash memory and storing said application code in said SDRAM; and
g) completing by said sub-control unit the booting of said NAND flash memory by driving said application code stored in said SDRAM.

5. The method as set forth in claim 4, further comprising the step of:
h) receiving and storing by said sub-control unit said IPL boot code sent from said main control unit,
wherein said sub-control unit, upon receiving said reset signal after completion of the storage of said IPL boot code, drives said IPL boot code to access said NAND flash memory.

* * * * *